United States Patent [19]

Maly et al.

[11] 4,101,426

[45] Jul. 18, 1978

[54] ACID COMPOSITION AND METHOD FOR ACID TREATING GEOLOGICAL FORMATIONS

[75] Inventors: George P. Maly, Newport Beach; Donald C. Young, Fullerton, both of Calif.

[73] Assignee: Union Oil Company of California, Brea, Calif.

[21] Appl. No.: 741,562

[22] Filed: Nov. 15, 1976

Related U.S. Application Data

[63] Continuation-in-part of Ser. No. 496,144, Aug. 9, 1974, abandoned.

[51] Int. Cl.$^2$ .............................................. E21B 43/27
[52] U.S. Cl. ............................... 252/8.55 C; 166/307; 252/8.55 R
[58] Field of Search ...................... 252/8.55 C, 8.55 R, 252/136; 166/307; 423/301, 316

[56] References Cited

U.S. PATENT DOCUMENTS

| | | | |
|---|---|---|---|
| 2,488,298 | 11/1949 | Lange et al. | 423/201 |
| 2,559,445 | 7/1951 | Lotz | 252/136 |
| 2,652,360 | 9/1953 | Bond et al. | 252/8.55 |
| 2,664,398 | 12/1953 | Bond | 252/8.55 |
| 2,742,425 | 4/1956 | Holbrook | 252/8.55 |
| 3,252,904 | 5/1966 | Carpenter | 252/8.55 |
| 3,260,569 | 7/1966 | Young | 252/136 X |

*Primary Examiner*—Herbert B. Guynn
*Attorney, Agent, or Firm*—Richard C. Hartman; Dean Sandford; Gerald L. Floyd

[57] ABSTRACT

An acid composition comprising a substantially anhydrous liquid mixture of (1) about 50 to 99 weight percent of polyphosphoric acid having about 5 to 90 weight percent of the total $P_2O_5$ present as polymeric $P_2O_5$, and (2) about 1 to 25 weight percent of hydrofluoric acid, and in which the $H_2O/P_2O_5$ mole ratio of the overall acid mixture is less than 3.4; and a method for increasing the permeability of siliceous subterranean formations in which the formation is treated with this composition. Also, the composition can optionally contain a catalyst such as a strong mineral acid, a carboxylic acid, an oxidizing agent, or mixtures thereof.

18 Claims, 1 Drawing Figure

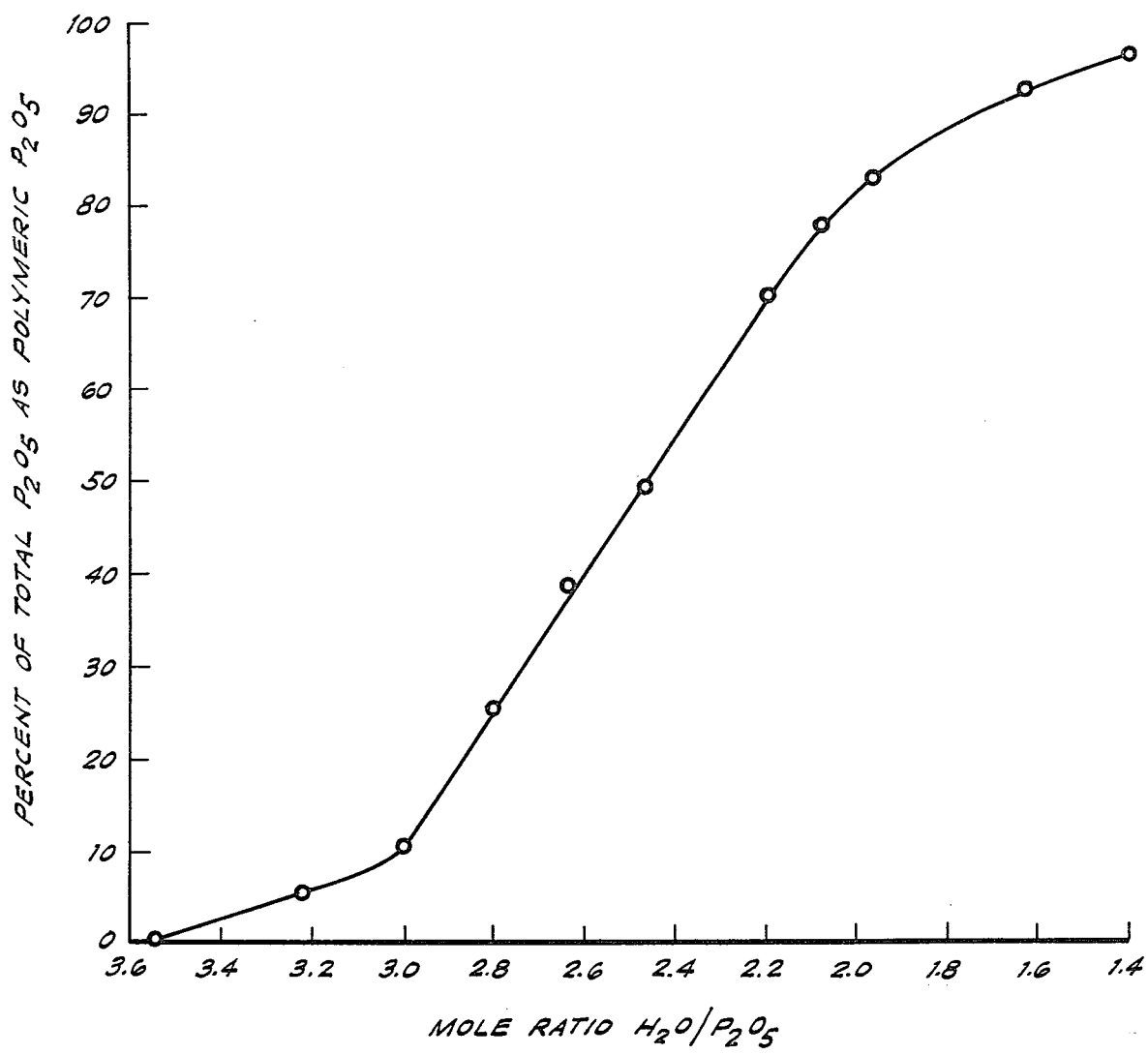

ACID COMPOSITION AND METHOD FOR ACID TREATING GEOLOGICAL FORMATIONS

CROSS-REFERENCES TO RELATED APPLICATIONS

This is a continuation-in-part of application Ser. No. 496,144 filed Aug. 9, 1974, now abandoned.

BACKGROUND OF THE INVENTION

1. Field of the Invention

The invention relates to the acid treatment of subterranean earth formations, and more particularly to the acid treatment of siliceous subterranean formations surrounding oil wells, gas wells, water injection wells, and similar boreholes.

2. Description of the Prior Art

Acid treatment or acidization is a well known method of stimulating oil producing and gas producing formations to increase the production rates of oil and gas therefrom, and to facilitate the ease with which fluid such as water, brine or gas can be injected into subterranean formations surrounding a well bore. Acidization of siliceous formations, e.g., sandstone, shale, serpentines, etc., has met with some favorable results when the formation is treated with hydrogen fluoride. Various modifications of this hydrogen fluoride acidization have been disclosed in the prior art. The acid compositions employed in these prior art methods have mainly consisted of various mixtures of hydrogen fluoride and various other mineral acids such as orthophosphoric acid, fluorophosphoric acid, sulfuric acid, hydrochloric acid, and the like. Although such mixtures are generally effective, experience has shown that many formations do not respond to the acid treatment. One difficulty with the above conventional acidizing techniques occurs when the acid solution becomes spent and precipitates solid materials which plug the pores of the producing formation.

In general, calcareous and siliceous formations are of a heterogeneous nature and contain a number of constituents such as iron, aluminum, alkali and alkaline earth metals. As a result, a problem common to all methods of acidizing is the production of precipitates within the formation interstices through the action of the acidic-treating reagent or its byproducts on some precipitate-forming constituent of the formation. As noted above, acidizing techniques have previously employed mixtures of phosphoric acid, generally referred to as ortho-phosphoric acid, with other mineral acids. However, the orthophosphates of polyvalent or heavy metals are all virtually insoluble in water. For example, calcium and magnesium compounds are found in all producing formations and when attacked by phosphoric acid mixtures form insoluble phosphates. The calcium and magnesium phosphates are especially difficult to remove and require expensive procedures to revitalize a producing formation damaged in this manner. Hence there exists a need for an acidizing technique which avoids the formation of insoluble precipitates in siliceous formations as the acid reacts with the formation and spends, i.e., is neutralized.

Most previously used acidizing solutions have a relatively low viscosity. In some acidizing treatments, for example in fracture acidizing or matrix acidizing where it is desired that the acid penetrate deeply into the formation via a few channels rather than penetrating the formation in a uniform manner, it is advantageous to use a relatively viscous acidizing solution.

Accordingly, a principal object of the invention is to provide a method for increasing the permeability of siliceous subterranean geological formations.

Another object of the invention is to provide a method for acidizing a siliceous subterranean geological formation that minimizes damage to the formation caused by plugging with insoluble precipitates.

Yet another object of the invention is to provide a method for increasing the permeability of siliceous subterranean geological formations containing calcareous and other mineral constituents.

Still another object of the invention is to provide a method for acid fracturing a siliceous subterranean geological formation that minimizes damage to the formation caused by plugging with insoluble precipitates.

A further object of the invention is to provide an improved acid composition for treating siliceous geological formations.

A still further object of the invention is to provide an improved acid composition for treating siliceous geological formations that does not form insoluble precipitates upon reaction with polyvalent metal cations in the formation.

Yet another object of the invention is to provide an improved acid composition for treating siliceous geological formations containing calcareous and other mineral constituents.

An additional object of the invention is to provide a viscous acidizing composition.

Other objects and advantages of the invention will be apparent from the following disclosure.

SUMMARY OF THE INVENTION

The invention relates to a novel substantially anhydrous liquid polyphosphoric acid composition and to a method for increasing the permeability of siliceous subterranean formations in which the formation is treated with this composition. The acid composition is a mixture of (1) about 50 to 99 weight percent of polyphosphoric acid having 5 to 90 weight percent of the total $P_2O_5$ present as polymeric $P_2O_5$, and (2) about 1 to 25 weight percent of hydrofluoric acid, and in which the $H_2O/P_2O_5$ mole ratio of the overall acid mixture is less than 3.4. Also, the composition can optionally contain a catalyst such as a strong mineral acid, a carboxylic acid, an oxidizing agent, or admixtures thereof. The acid composition can be utilized in both matrix acidizing and acid fracturing procedures, and also has utility in many other varied applications such as the drying of gases, extraction of metals from ores, the treatment of metals, the manufacture of fertilizers and in removing silica deposits from any surface, e.g., from the surfaces of steam boilers and pipes.

BRIEF DESCRIPTION OF THE DRAWING

The drawing is a graph illustrating the relationship of the polymeric $P_2O_5$ content of the phosphoric acid ingredient of the acid composition as a function of the mole ratio of $H_2O/P_2O_5$.

DESCRIPTION OF THE PREFERRED EMBODIMENTS

The general reactions involved in the attack of the substantially anhydrous liquid polyphosphoric-based acid compositions of this invention upon siliceous compounds is expressed by the following equation:

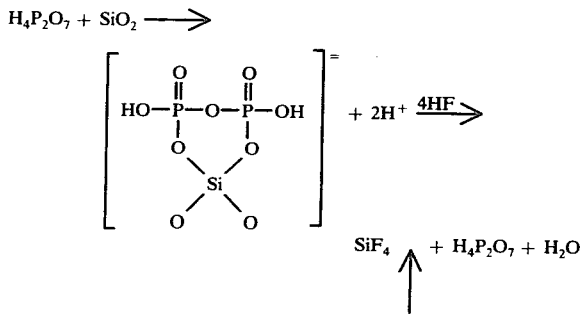

In the first step, a phosphosilicate complex is formed. Under anhydrous conditions the soluble phosphosilicate complex reacts with hydrofluoric acid to produce a gas, silicon tetrafluoride and to regenerate polyphosphoric acid and water. The overall concept of this invention is that the acid mixture rapidly dissolves the silica and complexes the other metals. Polyphosphoric acid mixtures having a mole ratio of water to phosphorus pentoxide ($H_2O/P_2O_5$) of between about 2.1 to 3.4, and particularly between about 2.2 and 2.8, form soluble complexes with most cations. Furthermore, the polyphosphate complexes are stable after neutralization. The in situ formation of gaseous silicon tetrafluoride provides the additional benefit of sweeping and carrying undissolved solids through the formation. Excess polyphosphoric acid is required to remove the ambient and produced water in order to keep the system in an anhydrous condition, i.e., maintaining the mole ratio of water to phosphorus pentoxide in the overall acid mixture below 3.4.

The composition of the acid mixture employed in carrying out this invention will depend upon its ultimate use. In the treatment of subterranean formations, the composition of the acid mixture will depend largely upon the particular type of formation to be acidized. In predominately siliceous geological formations containing sandstone, shale, or other siliceous rock compositions, acid mixtures are employed which comprise between about 50 to 99 weight percent of polyphosphoric acid having about 5 to 90 weight percent of the total $P_2O_5$ present as polymeric $P_2O_5$, about 1 to 25 weight percent of hydrofluoric acid, and optionally up to about 50 weight percent of a catalyst selected from the group consisting of strong mineral acids, carboxylic acids and oxidizing compounds, and in which the $H_2O/P_2O_5$ mole ratio of the overall acid mixture is between about 2.1 and 3.4.

The preferred acid compositions employed in treating siliceous formations comprise about 60 to 95 weight percent of substantially anhydrous liquid polyphosphoric acid having about 40 to 86 weight percent of the total $P_2O_5$ present as polymeric $P_2O_5$, about 2 to 8 weight percent of hydrofluoric acid, and optionally 2 to 40 weight percent of a catalyst selected from strong mineral acids, carboxylic acids, and oxidizing compounds, and in which the $H_2O/P_2O_5$ mole ratio is between 2.2 and 2.8.

In mixed formations, i.e., formations containing some calcareous materials and particularly those containing less than 15 percent calcareous materials in admixture with siliceous materials, it is preferred that the substantially anhydrous liquid acid composition also contain hydrochloric acid. The compositions employed in these formations preferably contain about 50 to 99 weight percent of a substantially anhydrous liquid polyphosphoric acid having about 5 to 90 weight percent of the total $P_2O_5$ present as polymeric $P_2O_5$, and more preferably about 60 to 95 weight percent of polyphosphoric acid having about 40 to 86 weight percent of the total $P_2O_5$ present as polymeric $P_2O_5$; about 1 to 25, and more preferably about 2 to 8, weight percent of hydrofluoric acid; and about 1 to 50, and more preferably about 2 to 30, weight percent of hydrochloric acid. These compositions exhibit an $H_2O/P_2O_5$ mole ratio of less than 3.4, and preferably about 2.2 to 2.8.

The hydrofluoric acid component may be prepared in situ by adding crystalline ammonium bifluoride to hydrochloric acid. The hydrogen chloride reacts with the bifluoride salt to form hydrogen fluoride. The more salt added, the greater will be the hydrogen fluoride concentration and the lower will be the hydrogen chloride concentration. Other preparative methods, including the mixing of hydrofluoric and hydrochloric acid solutions, can be employed. The use of such mixed acids is generally preferred.

Polyphosphoric acid is a generic term used to define the phosphoric acids having less water of constitution than orthophosphoric acid. Orthophosphoric acid contains one atom of phosphorus per molecule and has a theoretical mole ratio of water to phosphorus pentoxide of 3.0 or greater. Polyphosphoric acids have two or more atoms of phosphorus in a chain or ring structure in alternating sequence with oxygen, and a theoretical mole ratio of water to phosphorus pentoxide of less than 3. Polyphosphoric acid has two general forms, the acyclic and cyclic. The latter is commonly referred to as metaphosphoric acid. In the acyclic form, which is derived by limited molecular dehydration of orthophosphoric acid, the individual chains of phosphorus and oxygen atoms have terminal ends and a theoretical mole ratio of water to phosphorus pentoxide of between 2 and 3. In metaphosphoric acid, which is derived from the acyclic form by continued molecular dehydration, the chain is endless, forming ring structures. Metaphosphoric acids have theoretical mole ratios of water to phosphorus pentoxide of 2 or less. However, in some cases it is preferred that the concentration or dehydration of the orthophosphoric acid is stopped before the meta species begins to form. The reason is that the acyclic form of polyphosphoric acid is a much better complexing agent for aluminum and transition metals like iron, cobalt, nickel, copper, zinc, etc. Therefore, in geological formations which contain substantial amounts of compounds of the aforementioned metals, a polyphosphoric acid-based acidizing mixture with little or no meta polyphosphoric acid present would be most effective. Thus, the preferred acid compositions exhibit $H_2O/P_2O_5$ mole ratios above about 2.

The substantially anhydrous polyphosphoric acid component of the acid mixture of this invention may be prepared from either furnace acid or wet process acid. The various components are introduced into a suitable vessel with agitation or stirring preferably in a closed vessel or system. Open vessels are provided with a cooling means to avoid fuming vapors which are generated by the exothermal mixing of the acid components. The composition of this invention can be obtained by any suitable method depending on the source materials used. For example, a dilute wet-process phosphoric acid is processed to polyphosphoric acid by the addition of dilute, concentrated, or fuming sulfuric acid followed by concentration of the mixture through any suitable step, such as evaporation of water or by the addition of anhydrous phosphorus pentoxide and anhydrous hydrofluoric acid. When a polyphosphoric acid having an $H_2O/P_2O_5$ mole ratio of less than 2.6 is used, it is preferred to add concentrated (98% strength) sulfuric acid to avoid dilution of the $P_2O_5$ content. On the other hand fuming sulfuric acid, sulfur trioxide, and/or hydrofluoric acid can be added to polyphosphoric acid to obtain the proper percent of the other acids in the mixture. It is noted from the drawing that poly acid begins to form in the equilibrated acid at a mole ratio of water to $P_2O_5$ about 3.6, i.e., an acid containing about 95 weight percent orthophosphoric acid and still containing about 5 weight percent uncombined water. Although this composition has some free water, the acid is herein referred to as a substantially anhydrous acid since it is anhydrous in a sense that it has reached its maximum concentration of orthophosphoric acid and further concentration increases the poly acid content.

The total $P_2O_5$ content of the substantially anhydrous polyphosphoric based acid mixture is determined by diluting a representative sample with water, adding perchloric and nitric acids and boiling the mixture to convert all forms of phosphoric acid to orthophosphoric acid. Samples are then passed over a cation exchange resin to replace the metal cations with hydrogen as these cations will interfere with subsequent analysis. The ion exchanged sample is thereafter titrated with a strong base through two break-points, the first of which corresponds to the neutralization of the strong acids present, hydrochloric, nitric, etc., and the most strongly ionized hydrogen of the orthophosphoric acid. The second break-point in the titration curve occurs at a pH of about 9.5 to 10 and corresponds to neutralization of the second less strongly ionized hydrogen of the orthophosphoric acid. The difference in titer between these break-points corresponds to the total phosphate present which is reported as total $P_2O_5$.

The water content of the acid existing as water of constitution and water of dilution is determined by placing a weighted portion of the acid in a crucible with zinc oxide in excess of that needed to react with the acid. The crucible is then weighed, dried at 100° C. for 1 hour and placed in an oven at 500° C. for an hour. The loss in weight corresponds to the total water present in the acid mixture.

To determine the amount of orthophosphoric acid present, various analytical techniques can be employed. Regardless of the analytical method employed, prior thereto, the acid sample is prepared by dilution with water, and then acidifying it with concentrated sulfuric or nitric acid, followed by further dilution. Care should be taken to avoid elevated temperatures and the sample preparation should be done in an ice bath to avoid hydrolysis of the polyphosphoric acid. The resultant solution is passed over a strong acid, cation exchange resin, e.g., Amberlite IR-120H, to remove the metallic cation impurities which interfere with subsequent analysis. Immediately after passage over the resin, the acid should be neutralized to a pH of about 3.5 to about 6.0 to reduce the tendency of polyphosphoric acid to hyrolyze. The acid is thereafter titrated to the break-point, falling at a pH between about 9.5 and 10, corresponding to the neutralization of the second ionized hydrogen of the orthophosphoric acid. Thereafter an excess of a silver nitrate solution is added to precipitate silver orthophosphate and release the third, very weakly ionized hydrogen ion of the orthophosphoric acid. The resultant solution is then titrated to determine the amount of hydrogen ion released in the silver precipitation, and this titer value corresponds to the amount of orthophosphoric acid present in the sample which is reported on a $P_2O_5$ basis.

The amount of phosphorus pentoxide existing in the form of polyphosphoric acid can be determined by the difference between the total $P_2O_5$ present and that existing as orthophosphoric acid. When, however, the polyphosphoric acid is present in low concentrations, constituting 5 percent or less of the total $P_2O_5$ content, it is preferred to analyze for the polyphosphoric acid directly, by an anion exchange chromatography method such as described by Peters and Rieman in *Analytica Chimica Octa*, 14, page 131 and by Weiner in *Journal American Oil Chemist Society*, 34, page 124.

Catalytic agents which can be used to catalyze the above described general reaction are strong mineral acids, organic carboxylic acids, oxidizing compounds or mixtures thereof. These catalysts can be employed in concentration ranges of 0 to 50 weight percent and preferably in the range of 2 to 40 weight percent.

Strong mineral acids such as sulfuric, nitric, perchloric and hydrochloric acids or mixtures thereof can be used. One drawback with using sulfuric acid as a catalyst in acid mixtures for treating hydrocarbon formations is the possibility of sludge formation due to sulfuric acid attack on formation hydrocarbons. However, for the other utilities mentioned above, sulfuric acid is preferred for, in addition to the catalytic effect, it aids in dehydration and depresses the freezing point of polyphosphoric acid to yield a final product having a freezing point of less than about 30° F., thereby insuring that the mixture is liquid at ambient temperatures. Furthermore, sulfuric acid has an additional and surprising effect on the viscosity of the phosphoric acid for it reduces the acid viscosity by 50 to 75 percent at concentrations of about 20 to 40 weight percent based on 100 percent strength sulfuric acid, thereby allowing the use of polyphosphoric acid with a lower mole ratio of water to phosphorus pentoxide.

Suitable organic carboxylic acids useful as catalysts in the above-described reaction are those that form water-soluble or acid-soluble salts of alkali metals and alkaline earth metals. Aromatic and aliphatic monocarboxylic, dicarboxylic and tricarboxylic acids having from 1 to about 6 carbon atoms can be used. The carboxylic acids can be saturated or unsaturated and substituted or unsubstituted. The most common substituent is the chloride ion. For example, benzoic, formic, acetic, chloroacetic, peracetic, trichloroacetic, citric, oxalic and maleic acids or mixtures thereof are operable.

Oxidizing agents which can be employed include organic and inorganic peroxides, a compound containing the permanganate ion, the hypochlorite ion, the perchlorate ion or the chlorate ion, or a compound containing the chromium ion having a valence of 6. Specific compounds which may be used are, for example, benzoyl peroxide, hydrogen peroxide, potassium permanganate, potassium perchlorate, chromic acid, potassium chromate or mixtures thereof.

Other additives such as acid inhibitors are not normally required. For example, at temperatures below 160° F. acid inhibitors are not necessary. However, if additives are employed, they should be compatible with the acid mixture. Suitable inhibitors above this temperature may include inorganic arsenic compounds and acetylenic alcohols, thiophenols, heterocyclic nitrogen compounds, substituted thioureas, rosin amine derivatives, quaternary ammonium compounds and similar organic agents.

The novel acid mixtures of this invention can be prepared by mixing the components in suitable vessels. It is preferred that these vessels are vented and provided with cooling means to avoid fuming vapors since the mixing reaction is exothermic. Generally, the order of addition involves first adding the substantially anhydrous liquid phosphoric acid to the mixing vessel and the other components can be added in any order except that the hydrofluoric acid is introduced last.

The substantially anhydrous liqui phosphoric acid based mixtures of this invention can be used in both matrix acidizing and fracture acidizing. In matrix acidizing, the method of this invention is carried out by injecting the acid solution to be used into the producing formation surrounding the well bore. The injection pressure is kept below that necessary to fracture the formation so that penetration of the acid into the formation matrix occurs. The injection rate selected should be generally sufficient to keep the pressure below that necessary to fracture the formation. The acid mixture of the invention has a high solubility for siliceous formations resulting in products which are either solubilized or chelated in the form of low viscosity solutions. After the acid mixture has remained in contact with the exposed formation surfaces for a time sufficient to react therewith and to enlarge the formation passages, the low viscosity reaction effluent is flushed from the formation. Generally a spacer fluid such as a low-boiling, low aromatic-containing aliphatic hydrocarbon, e.g., diesel oil, jet fuel, etc., is injected followed by the injection of an afterflush fluid such as filtered crude oil, low calcium containing water, etc. Injection of the afterflush fluid displaces the spacer fluid and the low viscosity reaction effluent and is continued until the desired quantity is introduced. The well may be returned to production as soon after the afterflush has been injected as is practicable.

The acid mixtures of this invention exhibit high viscosities under most reservoir conditions and are particularly useful in fracture acidizing; which treatment, due to much lower fluid loss, promotes the formation of larger fractures and greater penetration than do the conventional fracturing techniques. The $P_2O_5$ content of the acid mixture has the greatest influence on viscosity. The viscosity generally ranges from about 500 to about 2,000 centipoises. Additional benefits derived from the high viscosity characteristics of the acid mixtures of this invention are that gelling agents need not be added to the acidizing mixture, and the use of diverting agents in th acidizing operation may be avoided. Conventional fracture acidizing equipment may be used in this operation. As mentioned above, because of the high viscosity characteristics, the acid mixtures of this invention can function as both the fracturing fluid and the acidizing reagent. Conventional propping agents can be used. In some instances, it is desirable to employ a graded sand of uniform spherical granular configuration such as a 20–40 mesh silica sand. This sand is retained within the fractured crevices after the acid mixture has been flushed therefrom and functions as a propping agent to retain the formation in a fractured condition. Through this use of sand, a temporary propping condition is attained inasmuch as the subsequent introduction of the acid mixture, capable of reacting with the siliceous components of the formation, will react with the siliceous propping agents resulting in their substantial disintegration. However, even functioning in a temporary capacity, the siliceous propping agents serve a useful purpose in retaining the formation in a fractured condition and thus facilitate the deeper penetration of subsequently injected acid mixtures into the fractured formation.

The invention is further illustrated by the following examples which are illustrative of specific modes of practicing the invention and are not intended as limiting the scope of the invention as defined by the appended claims.

EXAMPLE 1

The acid composition is prepared by adding 6,380 gallons of polyphosphoric acid (76% $P_2O_5$, 50% polymeric $P_2O_5$) to a stainless steel mixing tank equipped with a stirrer and a circulating water jacket. With slow stirring, 470 gallons of hydrofluoric acid (70% concentration) are added. The mixture is cooled to remove the heat of reaction. The acid mixture contains 94.1 weight percent polyphosphoric acid containing 50 weight percent of the total $P_2O_5$, present as polymeric acid and 6.9 weight percent of the hydrogen fluoride (70% aqueous solution), and in which the $H_2O/P_2O_5$ mole ratio in the overall acid mixture is 2.7. The specific gravity of the acid mixture is 1.88 at 79° F. Twenty-four tons (4 six-ton batches) of the acid composition were prepared, shipped to the well site and stored for about 1 week.

EXAMPLE 2

A waste water disposal well designed for the disposal of 30,000 barrels per day of water is drilled. When completed, the well will only take about 1,400 barrels per day of water at a 200 pound per square inch injection pressure measured at the surface. The well is treated with a conventional acid treatment utilizing a hydrochloric-hydrofluoric acid mixture. The volume rate of injection only increased to 2,160 barrels per day.

The treatment according to this invention consists of first stopping the injection of waste water, backwashing the disposal well, and then sampling several times by gas lifting the first, middle and last fluids produced. The well is backwashed again until the water becomes clean. Five hundred gallons of the substantially anhydrous liquid phosphoric acid based mixture described in Example 1 are injected at a maximum surface tubing pressure of 350 psi and a maximum of 180 psi on the casing. The next 2,000 gallons are injected at ½-barrel per minute at 50 psi at the wellhead and 300 psi on the casing. A last slug of 1,100 gallons is started at the rate of ½-barrel per minute at vacuum and is reduced to ¼-barrel per minute after the first 300 gallons are injected. After the acidizing treatment, the acid is displaced to total depth with 300 barrels of filtered lease water. First injection rates are measured after injecting about 30 barrels of filtered lease water at a wellhead pressure of 340 psi and at a rate of 13½ barrels per minute. During the next injection of about 300 barrels of filtered lease water, the injection rate through the casing increases to 14 barrels per minute and the injection pressure gradually decreases to 180 psi at the wellhead. The injection of lease water was never interrupted and is continued at ½-barrel per minute while the well was switched to the field injection system. The first rate recorded was 18,000 barrels per day, increasing rapidly to 22,000 barrels per day at 115 psi surface pressure.

EXAMPLE 3

This example illustrates the use of the method of the invention in fracture acidizing a subterranean oil producing formation. A production well is completed in a relatively shallow reservoir having a temperature of 130° F. and with a total productive interval of 15 feet perforated with two holes per foot at depths of 2,903 and 2,908 feet and 2,918 to 2,928 feet. The initial fracture is formed by the following treating fluid injections:
  (1) A spearhead injection of 3,000 gallons of the substantially anhydrous liquid phosphoric acid based mixture prepared in accordance with the procedure described in Example 1 is pumped into the formation under fracturing pressure. The initial portion of the acid fracturing fluid is injected at a pressure of 2,000 p.s.i.g. After fracturing the injection pressure dropped to 600 p.s.i.g. and the well is placed on vacuum.
  (2) An additional injection of 5,000 gallons of 40 gravity lease crude containing about 4 pounds per gallon of small, solid particles of sand suspended therein is injected at a pressure of 2,000 p.s.i.g., the injection pressure dropped to 600 p.s.i.g. and the well placed on vacuum.
  (3) 3,000 gallons of another slug of the substantially anhydrous liquid phosphoric acid based mixture fracturing fluid is injected at an initial pressure of 2,000 p.s.i.g., the injection pressure dropped 600 p.s.i.g.

A second stage fracture is formed by repeating the above fluid injections. Fluid injection rates average 16 to 18 barrels per minute at well head injection pressures of between 1,800 and 2,200 p.s.i.g. A third stage fracture is formed by repeating these injections at flow rates and pressures comparable to those encountered in the second stage fracturing. The acid fracturing fluid is flushed down from the tubing into the formation, and the well is returned to service in conventional manner. The production rate of oil is observed and the increase is found to be about four fold over the 29 barrels per day production rate prior to fracturing. This indicates that the fracturing operation is successful.

EXAMPLE 4

Another acid composition is prepared by adding 69.50 pounds of polyphosphoric acid (76% $P_2O_5$, 50% polymeric $P_2O_5$) to a stainless steel mixing tank equipped with a stirrer and a circulating water jacket. With slow stirring, 6.85 pounds hydrofluoric acid (70% by weight aqueous solution) and 23.65 pounds sulfuric acid (98% by weight aqueous solution) are added to the mixing tank. The mixture is cooled by circulating water during the mixing operation to remove the heat of reaction. The specific gravity of the resulting acid composition is 1.785 at 79° F. A total of 3,600 gallons of this acid composition are prepared and shipped to a Louisiana well site.

EXAMPLE 5

A Louisiana waste water disposal well is designed to have a 30,000 barrels per day (B/D) capacity for waste water. When completed, the well will take only about 1,400 barrels per day of water at an injection pressure measured at the surface of 200 pounds per square inch gauge (p.s.i.g). This low capacity of the well for injected water is believed due to the presence, in the gravel pack opposite the formation into which the water is injected and in the formation itself, of plugging material made up principally of finely divided solids from the clay-containing aqueous drilling mud with which the well has been drilled. About three months after being drilled the well is acidized according to established field practice in an attempt to remove such drilling mud solids and clean up the well. The acidizing treatment involves sequentially injecting through the gravel pack and into the formation: (a) a 500 gallon batch of inhibited 15 percent by weight hydrochloric acid; (b) a 1,000 gallon batch of inhibited aqueous solution containing 12 percent by weight hydrochloric acid and 3 percent by weight hydrofluoric acid; and (c) a second 500 gallon batch of the solution described in (a) above. Immediately following the acidizing treatment, waste water can be injected into the well at a rate of 3,000 B/D using 100 p.s.i.g. injection pressure. However, this improved injection rate lasts only a few hours and then drops to 2,160 B/D at an injection pressure of 200 p.s.i.g. Five months after this treatment the injection rate is an unsatisfactorily low 4,000 B/D at 250 p.s.i.g.

The well is then given an acidizing treatment according to this invention. The well is backwashed by producing it for several hours while sampling the first, middle and last fluids produced. At first considerable amounts of oil, bacteria and debris are produced along with the water. By the end of this first backwashing stage, the aqueous fluid produced is clear. The well is shut in overnight. The next day a second backwashing stage is carried out. At first, considerable amounts of oil, bacteria and debris appear again along with the water, but the produced fluids clear up within a few hours. There is injected into the formation through a 2 micron filter 180 barrels of fresh water containing 1,000 pounds sodium hydroxide and 900 pounds potassium chloride followed by a flush of 20 barrels of fresh water containing 100 pounds of potassium chloride. The purpose of this step is to place sodium hydroxide in the gravel pack and surrounding formation. This sodium hydroxide reacts exothermically with the subsequently injected acidizing solution to raise the temperature of the acidizing solution to enable it to more readily dissolve the plugging material in the vicinity of the well. The well is shut in for 40 hours. The well tubing is displaced by injecting therein 20 barrels of filtered lease brine. There is injected into the well a 500 gallon batch of the acidizing solution described in Example 4 at a rate of 4 barrels per minute (B/M) at a maximum surface tubing pressure of 350 p.s.i.g. and a maximum casing pressure of 180 p.s.i.g. Next, a 2,000 gallon batch of the acidizing solution of Example 4 is injected at a rate of 0.5 B/M at a maximum surface tubing pressure of 50 p.s.i.g. and a maximum casing pressure of 30–0 p.s.i.g. Finally, a 1,100 gallon batch of the acidizing solution of Example 4 is injected. This batch is started at a rate of 0.5 B/M at vacuum and trimmed down to 0.25 B/M after the first 300 gallon portion has been injected. The acidizing solution is displaced out of the tubing and out into the formation by injecting 300 barrels of lease brine. The first injection rate, measured after about 30 barrels of this batch of filtered lease brine has been injected, is 13.5 B/M at a surface pressure of 340 p.s.i.g. Another 300 gallon batch of filtered lease brine is injected. The injection rate increases to 14 B/M and the injection pressure gradually decreases to 180 p.s.i.g. Injection of filtered lease brine is continued at the rate of 0.5 B/M while the well is switched to the field injection system, i.e., waste water which has been produced along with oil from other wells in the field and which is to be reinjected into the formation. The first injection rate recorded is 18,000 B/D increasing rapidly to 22,000 B/D at 115 p.s.i.g. surface pressure.

The well is used daily for injecting waste water produced from other wells in the field. The amount of waste water injected is periodically monitored over a period of more than 2 years as follows:

| Test Number | Volume Waste Water Injected (B/D) | Injection Pressure (p.s.i.g.) |
|---|---|---|
| 1 | 13,060 | 225 |
| 2 | 11,200 | 200 |
| 3 | 17,680 | 250 |
| 4 | 12,710 | 190 |
| 5 | 11,550 | 200 |
| 6 | 15,280 | 290 |
| 7 | 18,510 | 150 |
| 8 | 19,370 | 260 |
| 9 | 22,590 | 350 |
| 10 | 19,210 | 360 |
| 11 | 20,690 | 425 |
| 12 | 21,550 | 490 |
| 13 | 23,610 | 375 |
| 14 | 34,590 | 400 |

Various embodiments and modifications of this invention have been described in the foregoing description and examples, and further modifications will be apparent to those skilled in the art. Such modifications are included within the scope of this invention as defined by the following claims.

Having now described the invention, we claim:

1. An acid composition comprising a substantially anhydrous liquid mixture containing about 60 to 95 weight percent of polyphosphoric acid having about 40 to 86 percent of the total $P_2O_5$ present as polymeric $P_2O_5$, about 2 to 8 weight percent of hydrofluoric acid, and wherein the $H_2O/P_2O_5$ mole ratio of the overall acid mixture is less than 3.4.

2. The composition defined in claim 1 including about 2 to 40 weight percent of a catalyst selected from the group consisting of (a) strong mineral acids selected from the group consisting of sulfuric, nitric and hydrochloric acids and mixtures thereof; (b) unsubstituted aromatic and unsubstituted aliphatic monocarboyxlic dicarboxylic and tricarboxylic acids having from 1 to about 6 carbon atoms and chlorine substituted derivatives thereof; and (c) oxidizing agents selected from the group consisting of organic and inorganic peroxides, a compound containing the permanganate ion, the hypochlorite ion, the perchlorate ion or the chlorate ion, and a compound containing the chromium ion having valence of 6.

3. The composition defined in claim 2 wherein said carboxylic acid is selected from the group consisting of benzoic, formic, acetic, chloroacetic, trichloroacetic, peracetic, citric, oxalic, maleic acids or mixtures thereof.

4. The composition defined in claim 2 wherein said oxidizing agent is selected from the group consisting of benzoyl peroxide, hydrogen peroxide, potassium permanganate, potassium perchlorate, chromic acid, potassium chromate or mixtures thereof.

5. The composition defined in claim 2 wherein said strong mineral acid is hydrochloric acid.

6. The composition defined in claim 5 wherein the hydrochloric acid is present in a concentration from about 2 to 30 weight percent.

7. The composition defined in claim 2 wherein said strong mineral acid is sulfuric acid.

8. The acid mixture according to claim 7 containing about 20 to 40 weight percent sulfuric acid.

9. A method for increasing the permeability of a silicone subterranean geological formation penetrated by a well bore which comprises introducing through said well bore and into the formation surrounding said well bore, at a pressure below the fracture pressure of the formation, a substantially anhydrous liquid acid composition comprising a mixture of about 60 to 95 weight percent of polyphosphoric acid, said polyphosphoric acid containing about 40 to 86 weight percent of the total $P_2O_5$ present as polymeric $P_2O_5$; about 2 to 8 weight percent of hydrofluoric acid; about 2 to 40 weight percent of a catalyst selected from the group consisting of (a) strong mineral acids selected from the group consisting of sulfuric, nitric and hydrochloric acids and mixtures thereof; (b) unsubstituted aromatic and unsubstituted aliphatic monocarboxylic, dicarboxylic and tricarboxylic acids having from 1 to about 6 carbon atoms and chlorine substituted derivatives thereof; and (c) oxidizing agents selected from the group consisting of organic and inorganic peroxides, a compound containing permanganate ion, the hypochlorite ion, the perchlorate ion or the chlorate ion, and a compound containing the chromium ion having a valence of 6 and wherein the $H_2O/P_2O_5$ mole ratio of the overall acid mixture is less than 3.4.

10. The method defined in claim 9 wherein said carboxylic acid is selected from the group consisting of benzoic, formic, acetic, chloroacetic, trichloroacetic, peracetic, citric, oxalic, maleic acids or mixtures thereof.

11. The method defined in claim 9 wherein said oxidizing agent is selected from the group consisting of benzoyl peroxide, hydrogen peroxide, potassium permanganate, potassium perchlorate, chromic acid, potassium chromate or mixtures thereof.

12. The method defined in claim 9 wherein said strong mineral acid is hydrochloric acid.

13. The method defined in claim 12 wherein the hydrochloric acid is present in a concentration from about 2 to 30 weight percent.

14. A method for increasing the permeability of a siliceous subterranean geological formation penetrated by a well bore which comprises hydraulically fracturing said formation by introducing thereinto at a pressure sufficient to fracture said formation a highly viscous substantially anhydrous liquid acid composition comprising a mixture of 60 to 95 weight percent of polyphosphoric acid, said polyphosphoric acid containing about 40 to 86 weight percent of the total $P_2O_5$ present as polymeric $P_2O_5$; about 2 to 8 weight percent of hydrofluoric acid; about 2 to 40 weight percent of a catalyst selected from the group consisting of (a) strong mineral acids selected from the group consisting of a sulfuric, nitric and hydrochloric acids and mixtures thereof; (b) unsubstituted aromatic and unsubstituted aliphatic monocarboxylic, dicarboxylic and tricarboxylic acids having from 1 to about 6 carbon atoms and chlorine substituted derivatives thereof; and (c) oxidizing agents selected from the group consisting of organic and inorganic peroxides, a compound containing permanganate ion, the hypochlorite ion, the perchlorate ion or the chlorate ion, and a compound containing the chromium ion having a valence of 6 and wherein the $H_2O/P_2O_5$ mole ratio of the overall acid mixture is less than 3.4.

15. The method defined in claim 14 wherein said carboxylic acid is selected from the group consisting of benzoic, formic, acetic, chloroacetic, trichloroacetic, peracetic, citric, oxalic, maleic acids or mixtures thereof.

16. The method defined in claim 14 wherein said oxidizing agent is selected from the group consisting of benzoyl peroxide, hydrogen peroxide, potassium permanganate, potassium perchlorate, chromic acid, potassium chromate or mixtures thereof.

17. The method defined in claim 14 wherein said strong mineral acid is hydrochloric acid.

18. The method defined in claim 17 wherein the hydrochloric acid is present in a concentration from about 2 to 30 weight percent.

* * * * *